(12) United States Patent
Goto

(10) Patent No.: US 9,840,866 B2
(45) Date of Patent: Dec. 12, 2017

(54) VEHICLE DOOR CONTROLLING DEVICE

(71) Applicant: TOYOTA JIDOSHA KABUSHIKI KAISHA, Toyota-shi (JP)

(72) Inventor: Yuya Goto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/025,461

(22) PCT Filed: Sep. 25, 2014

(86) PCT No.: PCT/JP2014/075506
§ 371 (c)(1),
(2) Date: Mar. 28, 2016

(87) PCT Pub. No.: WO2015/072230
PCT Pub. Date: May 21, 2015

(65) Prior Publication Data
US 2016/0208541 A1  Jul. 21, 2016

(30) Foreign Application Priority Data

Nov. 18, 2013 (JP) .................................. 2013-238261

(51) Int. Cl.
*E05F 15/20* (2006.01)
*E05F 15/76* (2015.01)
(Continued)

(52) U.S. Cl.
CPC ................. *E05F 15/76* (2015.01); *B60J 5/04* (2013.01); *B60R 25/245* (2013.01);
(Continued)

(58) Field of Classification Search
CPC ........... E05F 15/76; B60J 5/04; B60R 25/245; G07C 9/00182; G07C 2209/64; E05Y 2900/531
(Continued)

(56) References Cited

U.S. PATENT DOCUMENTS 6,323,565 B1 * 11/2001 Williams, Jr. .......... E05B 77/48
307/10.1
6,583,715 B1 * 6/2003 Benzie ............... G07C 9/00182
340/5.62
(Continued)

FOREIGN PATENT DOCUMENTS

DE   102006015930 A1   12/2006
DE   102007041288 A1   3/2009
(Continued)

OTHER PUBLICATIONS

International Search Report dated Dec. 22, 2104 for PCT/JP2014/075506 filed on Sep. 25, 2014.

*Primary Examiner* — Jerry Redman
(74) *Attorney, Agent, or Firm* — Oblon, McClelland, Maier & Neustadt, L.L.P.

(57) ABSTRACT

A vehicle door controlling device includes a vehicle-side controller, installed on the vehicle including a door capable of being opened automatically; and a mobile device on which reservation setting of automatic door-opening of the door can be made by a user. The mobile device can transmit a signal that includes information about the reservation setting. The vehicle-side controller can receive the signal, detect the mobile device having the reservation setting and existing in a first area around the door, based on the signal received by the receiver unit, and unlock the door when the mobile device having the reservation setting has been detected in the first area by the first detection unit, and to open the door when the mobile device detected in the first (Continued)

area by the first detection unit is further being detected in the first area for a predetermined time.

8 Claims, 5 Drawing Sheets

(51) Int. Cl.
    *G07C 9/00*     (2006.01)
    *B60R 25/24*     (2013.01)
    *B60J 5/04*     (2006.01)

(52) U.S. Cl.
    CPC .... *G07C 9/00182* (2013.01); *E05Y 2900/531* (2013.01); *G07C 2009/00793* (2013.01); *G07C 2209/64* (2013.01)

(58) Field of Classification Search
    USPC .......................................................... 49/25
    See application file for complete search history.

(56) References Cited

U.S. PATENT DOCUMENTS

| | | | | |
|---|---|---|---|---|
| 8,933,778 | B2 * | 1/2015 | Birkel | B60R 25/24 340/5.54 |
| 9,499,125 | B2 * | 11/2016 | Akay | B60R 25/24 |
| 2001/0038328 | A1 * | 11/2001 | King | B60K 37/06 340/5.64 |
| 2001/0054952 | A1 * | 12/2001 | Desai | E05B 77/48 340/5.72 |
| 2002/0025803 | A1 * | 2/2002 | Park | G07C 9/00182 455/420 |
| 2005/0174218 | A1 * | 8/2005 | Jordan | B60R 25/1003 340/426.1 |
| 2006/0214769 | A1 | 9/2006 | Nakashima et al. | |
| 2006/0224290 | A1 * | 10/2006 | Nakashima | B60R 25/24 701/49 |
| 2006/0244312 | A1 | 11/2006 | Ogino et al. | |
| 2007/0115096 | A1 | 5/2007 | Suzuki et al. | |
| 2007/0126246 | A1 | 6/2007 | Suzuki et al. | |
| 2007/0200670 | A1 * | 8/2007 | McBride | B60R 25/245 340/5.72 |
| 2007/0290796 | A1 * | 12/2007 | Teshima | B60R 25/2036 340/5.72 |
| 2008/0119977 | A1 * | 5/2008 | Beuter | F02D 41/266 701/31.4 |
| 2009/0030579 | A1 | 1/2009 | Takehisa | |
| 2009/0309714 | A1 * | 12/2009 | Baruco | B60R 25/245 340/539.11 |
| 2010/0222939 | A1 * | 9/2010 | Namburu | G07C 9/00111 701/2 |
| 2011/0043328 | A1 * | 2/2011 | Bassali | G07C 9/00182 340/5.71 |
| 2011/0316669 | A1 * | 12/2011 | McBride | B60R 25/245 340/5.72 |
| 2013/0169408 | A1 | 7/2013 | Endo | |
| 2014/0188348 | A1 * | 7/2014 | Gautama | B60W 10/30 701/48 |
| 2014/0292481 | A1 * | 10/2014 | Dumas | G07C 9/00111 340/5.61 |
| 2015/0097651 | A1 * | 4/2015 | Clough | E05F 15/77 340/5.7 |

FOREIGN PATENT DOCUMENTS

| | | |
|---|---|---|
| JP | 2006-266023 A | 10/2006 |
| JP | 2006-307592 A | 11/2006 |
| JP | 2006-328932 A | 12/2006 |
| JP | 2007-138471 A | 6/2007 |
| JP | 2007-138565 A | 6/2007 |
| JP | 2007-138566 A | 6/2007 |
| JP | 2009-007801 A | 1/2009 |
| JP | 2009-024454 A | 2/2009 |
| JP | 2012-162908 A | 8/2012 |
| KR | 10-2005-0020678 A | 3/2005 |

* cited by examiner

ENTER OUT-OF-COMPARTMENT VALIDATION AREA

ENTER AUTOMATIC DOOR-OPENING AREA

VEHICLE DOOR CONTROLLING DEVICE

TECHNICAL FIELD

The present invention relates to a vehicle door controlling device that opens a door of a vehicle automatically.

BACKGROUND ART

Conventionally, a vehicle door controlling device has been known that has a vehicle-side controller to receive a reservation signal from a mobile terminal, which transmits the reservation signal representing reservation of automatic door-opening of a vehicle door, when a user holding the mobile terminal approaches the door, and if detecting the user, executes door-unlocking and door-opening (for example, Patent Document 1).

[Patent Document 1] Japanese Laid-open Patent Publication No. 2009-024454

However, the vehicle door controlling device described in Patent Document 1 executes door-unlocking and door-opening, just by receiving the reservation signal transmitted from the mobile terminal, and detecting the user, and hence, the door may be opened against a circumstance around the vehicle and/or an intention of the user. For example, if an obstacle exists on a door-opening trajectory of the door, and the door-opening is executed just by receiving the reservation signal and detecting the user, the obstacle may come into contact with the door, and the door may be damaged. Also, it is likely to happen that the user forgets that he/she has made a reservation operation on the mobile terminal, the door may be opened in a circumstance where the user does not expect the door to open.

SUMMARY OF THE INVENTION

Problem to be Solved by Invention

An object of an embodiment of the present invention is to provide a vehicle door controlling device that can open a door of a vehicle automatically when a user approaches the vehicle, considering a circumstance around the vehicle and the intention of the user.

Means to Solve the Problem

According to an embodiment of the present invention, a vehicle door controlling device includes a vehicle-side controller, installed on the vehicle including a door capable of being opened automatically; and a mobile device on which a reservation setting of automatic door-opening of the door can be made by a user. The mobile device includes a transmitter unit configured to transmit a signal that includes information about the reservation setting, by a wireless communication function. The vehicle-side controller includes a receiver unit configured to receive the signal transmitted from the mobile device, a first detection unit configured to detect the mobile device having the reservation setting and existing in a first area around the door, based on the signal received by the receiver unit, and a control unit configured to unlock the door when the mobile device having the reservation setting has been detected in the first area by the first detection unit, and to open the door when the mobile device detected in the first area by the first detection unit is further being detected in the first area for a predetermined time.

According to another embodiment of the present invention, a vehicle door controlling device includes a vehicle-side controller, installed on the vehicle including a door capable of being opened automatically; and a mobile device on which a reservation setting of automatic door-opening of the door can be made by a user. The mobile device includes a transmitter unit configured to transmit a signal that includes information about the reservation setting, by a wireless communication function. The vehicle-side controller includes a receiver unit configured to receive the signal transmitted from the mobile device, a first detection unit configured to detect the mobile device having the reservation setting, and existing in a first area around the door, based on the signal received by the receiver unit, a second detection unit configured to detect the mobile device existing in a second area included the first area and formed on a side approaching the door in the first area, based on the signal received by the receiver unit, and a control unit configured to unlock the door when the mobile device having the reservation setting has been detected in the first area by the first detection unit, and to open the door when the mobile device detected in the first area by the first detection unit is further detected in the second area by the second detection unit.

Advantage Of The Invention

According to the embodiments, it is possible to provide a vehicle door controlling device that can open a door of a vehicle automatically when a user approaches the vehicle, considering a circumstance around the vehicle and the intention of the user.

MODE FOR CARRYING OUT THE INVENTION

In the following, embodiments will be described with reference to the drawings.

[First Embodiment]

Figure 1:
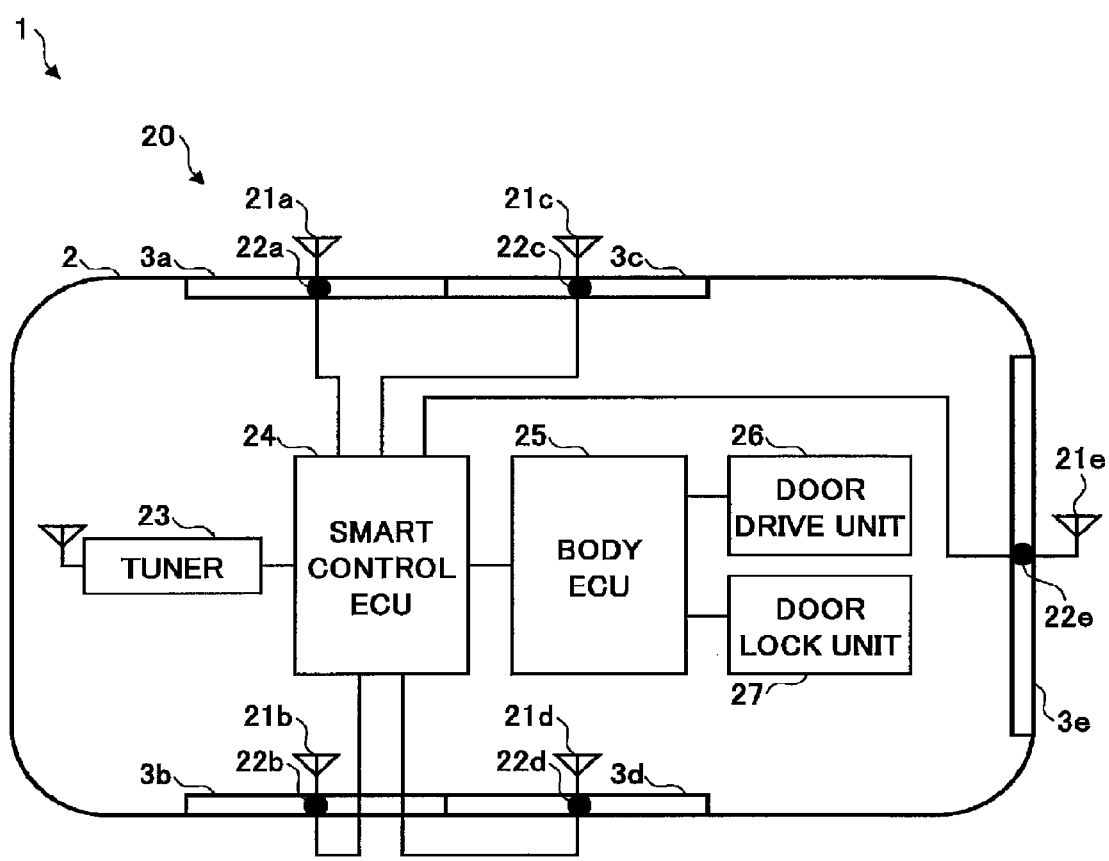
FIG. 1 is a block diagram that illustrates a configuration of a vehicle door controlling device.
Figure 1:
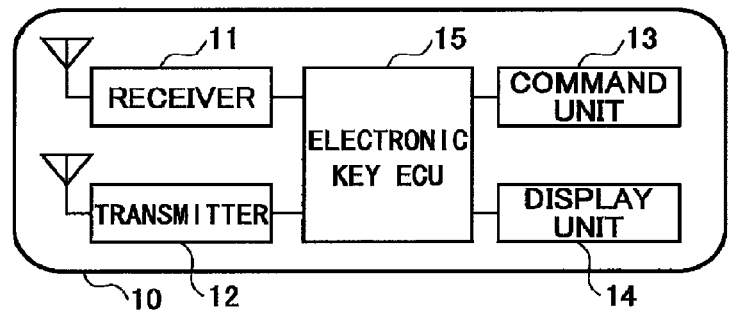

FIG. 1 is a block diagram that illustrates a configuration of a vehicle door controlling device 1 according to an embodiment. The vehicle door controlling device 1 includes an electronic key 10 (a mobile device) and a vehicle-side controller 20 installed on a vehicle 2.

The vehicle 2 having the vehicle-side controller 20 installed is a so-called "minivan", and has doors 3a to 3e. Among the doors 3a to 3e, the doors 3c and 3d are slide doors for rear seats (in the second row and the third row) that can be opened and closed in the back-and-forth direction of the vehicle 2, and are so-called "power-slide doors" (PSDs) that can be opened and closed automatically by actuators (such as electric motors). Also, the door 3e is a back door installed at a rear part of the vehicle, and is a so-called "power back door" (PBD) that can be opened and closed automatically by an actuator (such as an electric motor). Note that the doors 3a and 3b are hinge doors for front seats (in the first row) that can be opened and closed manually.

The vehicle door controlling device 1 executes predetermined control of the doors 3a to 3e (for example, unlock and lock control), based on a validation result of an ID code by bidirectional communication between the electronic key 10 and the vehicle-side controller 20, namely, executes so-called "smart entry control". In the embodiment, the vehicle door controlling device 1 executes automatic door-opening control for doors that can be opened automatically (the power slide doors and the power back door). Details will be described later.

The electronic key 10 is an authentication terminal that is portable and has wireless communication functions. When the electronic key 10 transmits a specific ID code stored inside to the vehicle-side controller 20, the vehicle-side controller 20 (a smart control ECU 24) validates the ID code, and if authenticated, the vehicle-side controller 20 executes the smart entry control specifically for the electronic key 10.

The electronic key 10 may include a receiver 11, a transmitter 12, a command unit 13, a display unit 14, and an electronic key ECU 15.

The receiver 11 is a radio wave receiver unit to receive request signals or the like transmitted from out-of-compartment transmitters 22a to 22e, via out-of-compartment antennas 21a to 21e of the vehicle-side controller 20. The receiver 11 is connected with the electronic key ECU 15 to communicate with each other, and outputs a received request signal to the electronic key ECU 15.

The transmitter 12 is a radio wave transmitter unit that is connected with the electronic key ECU 15 to communicate with each other, and in response to a command from the electronic key ECU 15, transmits a response signal or the like corresponding to the request signal, to the vehicle-side controller 20.

The command unit 13 may be configured to include operational buttons, which can be operated by a user to issue lock and unlock commands of the doors 3a to 3e, and door-open commands and door-close commands of the doors 3c to 3e. The lock commands, unlock commands, door-open commands, and door-close commands based on operations on the command unit 13 are transmitted to the vehicle-side controller 20 as respective command signals via the electronic key ECU 15 and the transmitter 12. Then, the smart control ECU 24 that has received the command signals via a tuner 23, locks and unlocks the doors 3a to 3e, and opens and closes the doors 3c to 3e automatically, via a body ECU 25. Also, the command unit 13 is configured to be capable of making a reservation setting of automatic door-opening of the doors 3c to 3e by user operations. As described above, since the doors 3c and 3d are power slide doors, and the door 3e is a power back door, these doors can be opened automatically by the smart entry control by the vehicle-side controller 20. Therefore, by making it possible for the user to make the reservation setting of automatic door-opening on the electronic key 10 that transmits a signal including information about the reservation setting from the transmitter 12 to the vehicle-side controller 20, automatic door-opening of the doors 3c to 3e based on the reservation setting is implemented. The automatic door-opening control of the vehicle-side controller 20 will be described later in detail. Note that as for the reservation setting of automatic door-opening of the doors 3c to 3e on the command unit 13, a specific door(s) among the doors 3c to 3e may be specified for the reservation setting of automatic door-opening. The command unit 13 is connected with the electronic key ECU 15 to communicate with each other, and transmits an output signal corresponding to an operation by the user to the electronic key ECU 15.

The display unit 14 is a unit for displaying information about validation of the ID code by bidirectional communication between the electronic key 10 and the vehicle-side controller 20, information about states of the doors 3a to 3e (locked or unlocked state, opened or closed state, etc.), and the like, and may include, for example, an liquid crystal display. The display unit 14 is connected with the electronic key ECU 15 to communicate with each other, and may display the information transmitted from the electronic key ECU 15.

The electronic key ECU 15 is a control device that controls the electronic key 10 as a whole, and is connected with the receiver 11, the transmitter 12, the command unit 13, the display unit 14, and the like, to communicate with each other. The electronic key ECU 15 includes a CPU, a ROM, and a RAM, and may execute various control processes by running various programs stored in the ROM, on the CPU. Specifically, in response to a request signal received by the receiver 11, the electronic key ECU 15 may generate a response signal, to transmit it to the vehicle-side controller 20 via the transmitter 12. Also, in response to a user operation on the command unit 13, the electronic key ECU 15 may generate a lock command signal or an unlock command signal of the doors 3a to 3e, to transmit it to the vehicle-side controller 20 via the transmitter 12. Also, in response to a user operation on the command unit 13, the electronic key ECU 15 may generate an automatic open command signal or an automatic close command signal of the doors 3c to 3e, to transmit it to the vehicle-side controller 20 via the transmitter 12. Also, in response to a user operation on the command unit 13, the electronic key ECU 15 may generate information about a reservation setting of automatic door-opening of the doors 3c to 3e, to store it in the RAM or the like. Also, information about validation result of the ID code transmitted from the vehicle-side controller 20 (the out-of-compartment transmitters 22a to 22e) and obtained via the receiver 11, and information about states of the doors 3a to 3e, may be output to the display unit 14 as information that can be displayed. Note that a response signal generated by the electronic key ECU 15 may include information about the ID code specific to the electronic key 10 that is stored in a storage device such as the ROM or the like of the electronic key ECU 15, and information about a reservation setting of automatic door-opening of the doors 3c to 3e stored in the RAM or the like.

The vehicle-side controller 20 may include the out-of-compartment antennas 21a to 21e, the out-of-compartment transmitters 22a to 22e, and the tuner 23 as units to communicate with the electronic key 10. Also, the vehicle-side controller 20 may include the smart control ECU 24, the body ECU 25, a door drive unit 26, and a door lock unit 27 as specific control units of the doors 3a to 3e.

The out-of-compartment antennas 21a to 21e are radio wave transmitter units that correspond to the out-of-compartment transmitters 22a to 22e, respectively, and are installed in door handles or the like to transmit request signals and the like transmitted from the smart control ECU 24 as radio waves.

The out-of-compartment transmitters 22a to 22e are installed corresponding to the doors 3a to 3e, respectively, and transmit request signals and the like transmitted from the smart control ECU 24 as radio waves via the out-of-compartment antennas 21a to 21e. The reachable range of a request signal transmitted by the out-of-compartment transmitters 22a to 22e is, for example, about 1.0 m. The reachable range of a transmitted request signal forms a detection area of the electronic key 10, namely, forms an out-of-compartment validation area (a first area) to validate the ID code by bidirectional communication between the electronic key 10 and the vehicle-side controller 20. The out-of-compartment transmitters 22a to 22e may be connected with the smart control ECU 24 by an in-vehicle network, for example, a LIN (Local Interconnect Network) to communicate with each other.

The tuner 23 is a radio wave receiver unit to receive a response signal or the like transmitted from the electronic key 10 (the transmitter 12). The tuner 23 is connected with the smart control ECU 24 by an in-vehicle network, for example, a LIN (Local Interconnect Network), to communicate with each other, and transmits a received response signal to the smart control ECU 24.

Both the smart control ECU 24 and the body ECU 25 are constituted with microcomputers, for example, and include CPUs, ROMs, RAMs, timers, counters, input interfaces, and output interfaces, respectively. Note that functions of the smart control ECU 24 and the body ECU 25 may be arbitrarily implemented by hardware, software, or firmware, or a combination of these. For example, a part of or all of the functions of the smart control ECU 24 and the body ECU 25 may be implemented by ASICs (Application-Specific Integrated Circuits) and/or FPGAs (Field Programmable Gate Arrays). Also, a part of or all of the functions of the smart control ECU 24 and the body ECU 25 may be implemented by the other ECUs. Also, the smart control ECU 24 and the body ECU 25 may implement a part of or all of functions of the other ECUs. For example, a part of or all of the functions of the body ECU 25 may be implemented by the smart control ECU 24, or a part of or all of the functions of the smart control ECU 24 may be implemented by the body ECU 25.

The smart control ECU 24 is a main control unit in the vehicle door controlling device 1 that controls validation of the ID code by bidirectional communication between the electronic key 10 and the vehicle-side controller 20, and controls smart entry based on a validation result. The smart control ECU 24 is connected with the out-of-compartment transmitters 22a to 22e, the tuner 23, the body ECU 25 and the like by an in-vehicle network, for example, a CAN (Controller Area Network) or a LIN (Local Interconnect Network) to communicate with each other. The smart control ECU 24 may execute various control processes by running various programs stored in the ROM, on the CPU. Specifically, the smart control ECU 24 may form an out-of-compartment validation area by generating a request signal and transmitting the signal via the out-of-compartment transmitters 22a to 22e. Also, based on a response signal transmitted from the electronic key 10 and received via the tuner 23, the smart control ECU 24 may verify the ID code of the electronic key 10. Also, as a result of the validation, the smart control ECU 24 may authenticate the electronic key 10, to detect the electronic key 10 in the out-of-compartment validation area. In other words, the smart control ECU 24 may detect a user holding the electronic key 10 in the out-of-compartment validation area. Also, based on a response signal transmitted from the electronic key 10 and received via the tuner 23, the smart control ECU 24 may detect whether a reservation setting of automatic door-opening of the doors 3c to 3e has been made on the authenticated electronic key 10. Also, if detecting (a user holding) the electronic key 10 having the reservation setting in the out-of-compartment validation area, the smart control ECU 24 may control the door lock unit 27 via the body ECU 25, to unlock the doors 3a to 3e. Also, if detecting (a user holding) the electronic key 10 having the reservation setting in the out-of-compartment validation area, and further detecting predetermined behavior of the user (behavior requesting automatic door-opening), the smart control ECU 24 may control the door drive unit 26 via the body ECU 25, to execute automatic door-opening of the doors 3c to 3e.

Note that the smart control ECU 24 may transmit request signals that include identification codes specific to the out-of-compartment transmitters 22a to 22e via the out-of-compartment transmitters 22a to 22e, respectively. Then, in response to the request signals, the electronic key 10 may transmit response signals that include the identification codes. Also, the smart control ECU 24 may transmit request signals to the out-of-compartment transmitters 22a to 22e sequentially with time lags. Thus, the smart control ECU 24 can determine which one of the request signals transmitted by the out-of-compartment transmitters 22a to 22e, has made the electronic key 10 transmit the response signal. In other words, the smart control ECU 24 can determine around which one of the doors 3a to 3e, (a user holding) the electronic key 10 exists.

The body ECU 25 is a control unit that controls locking and unlocking the doors 3a to 3e, and opening and closing the doors 3c to 3e automatically. Specifically, the body ECU 25 may control driving an actuator for door-locking (such as a door lock motor) included in the door lock unit 27, to lock or unlock the doors 3a to 3e. Also, the body ECU 25 may control driving an actuator for door-driving (such as a slide-door-driving motor and a back-door-driving motor) included in the door drive unit 26, to open or close the doors 3c to 3e automatically. Note that other than controlling the doors 3a to 3e, the body ECU 25 may also control electrical components installed in the vehicle 2 such as lamps, an air conditioner, wipers, and meter panels.

The door drive unit 26 is a drive unit that automatically drives the doors 3c to 3e to be opened or closed, which can be opened or closed automatically. The door drive unit 26 may include slide-door-drive motors and drive cables to drive the doors 3c and 3d, which are power slide doors, and release motors to release latches holding fully closed states of the doors 3c and 3d. Also, the door drive unit 26 may include a back-door-drive motor to drive the door 3e, which is a back door, and a release motor to release a latch holding a fully closed state of the door 3e.

The door lock unit 27 is a drive unit to drive a lock mechanism to lock and unlock the doors 3a to 3e. The door lock unit may include door lock motors installed for the respective doors 3a to 3e.

Next, the smart entry control by the vehicle door controlling device 1 (the smart control ECU 24) in the embodiment will be described, especially, about automatic door-opening control of the doors 3c to 3e based on a reservation setting in the electronic key 10.

Figure 2A:
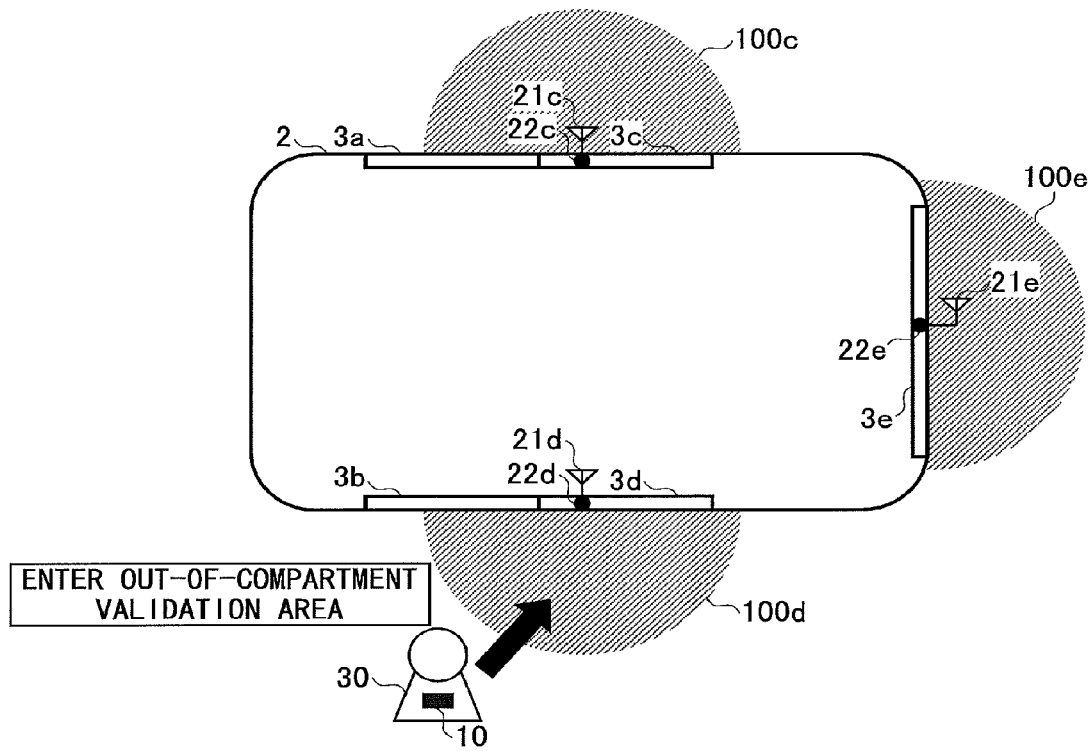
FIGS. 2A-2B are diagrams that illustrate operations of a vehicle door controlling device according to a first embodiment.
Figure 2B:
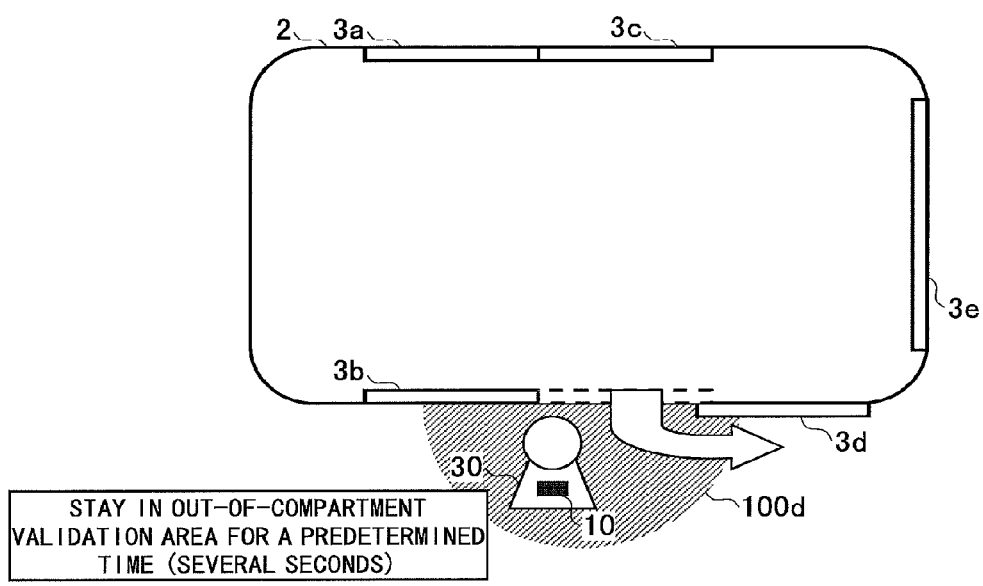

FIGS. 2A-2B are diagrams that illustrate operations of the vehicle door controlling device 1 according to the embodiment. Specifically, the figures are plan views of the vehicle 2 that schematically illustrate automatic door-opening control of the doors 3c to 3e based on the reservation setting in the electronic key 10. Both FIGS. 2A and 2B represent examples of situations in which a user 30 of the vehicle 2, who holds the electronic key 10 having the reservation setting of automatic door-opening of the doors 3c to 3e, approaches the door 3d, which is a rear door on the left side of the vehicle 2, to get seated (or to load luggage) on a rear seat of the vehicle 2. Note that FIGS. 2A and 2B illustrate examples where the user 30 approaches the door 3d, and the door 3d is opened. Situations are virtually the same if the user 30 approaches the door 3c or 3e, and description of those cases is omitted.

FIG. 2A is a diagram that illustrates that the user 30 holding the electronic key 10 having the reservation setting of automatic door-opening of the doors 3c to 3e, enters an out-of-compartment validation area 100d of the door 3d.

Referring to FIG. 2A, the out-of-compartment validation areas 100c to 100e are formed around the doors 3c to 3e by request signals transmitted from the out-of-compartment transmitters 22c to 22e, respectively, which have outer edges set by the reachable range of the request signals, and semicircular shapes in plan view. Note that although not illustrated for the sake of simplicity, out-of-compartment validation areas 100a and 100b may be formed corresponding to request signals transmitted from the out-of-compartment transmitters 22a and 22b.

When the user 30 holding the electronic key 10 having the reservation setting of automatic door-opening of the doors 3c to 3e enters the out-of-compartment validation area 100d, then, in response to the request signal, the electronic key 10 transmits a response signal that includes information about the ID code and the reservation setting to the vehicle-side controller 20 (the smart control ECU 24). The transmitted response signal is received by the smart control ECU 24 via the tuner 23, with which the smart control ECU 24 validates the ID code.

As a result of the validation, if the electronic key 10 is authenticated, the smart control ECU 24 also determines whether information about the reservation setting of automatic door-opening of the doors 3c to 3e is included in the response signal. Since the electronic key 10 in the example is assumed to have the reservation setting of automatic door-opening of the doors 3c to 3e, the smart control ECU 24 determines that a signal about the reservation setting is included in the response signal. Note that as described above, by having the response signal include an identification code that corresponds to one of the out-of-compartment transmitters 22a to 22e, or by transmitting response signals to the out-of-compartment transmitters 22a to 22e with time lags, the smart control ECU 24 can determine in which one of the out-of-compartment validation areas 100a to 100e, the electronic key 10 is detected.

In this way, the smart control ECU 24 detects the electronic key 10 having the reservation setting of automatic door-opening of the doors 3c to 3e, namely, the user 30 holding the electronic key 10, in the out-of-compartment validation area 100d. Having detected the user 30 holding the electronic key 10 having the reservation setting of automatic door-opening of the doors 3c to 3e in the out-of-compartment validation area 100d, the smart control ECU 24 unlocks the doors 3a to 3e via the body ECU 25. At this moment, the user 30 can recognize that the doors 3a to 3e of the vehicle 2 are being unlocked, by operational sound of the actuator for door-locking included in the door lock unit 27, or the like. Note that when unlocking the doors 3a to 3e, the smart control ECU 24 may have the user 30 recognize that they are being unlocked, by blinking the lamps of the vehicle 2 via the body ECU 25, or the like.

Also, FIG. 2B illustrates a case where the user 30 holding the electronic key 10 having the reservation setting of automatic door-opening of the doors 3c to 3e, carries out predetermined behavior that requests automatic door-opening, namely, the user 30 continues to stay in the out-of-compartment validation area 100d.

Referring to FIG. 2B, having unlocked the doors 3a to 3e, the smart control ECU 24 detects the predetermined behavior of the user 30 holding the electronic key 10 having the reservation setting of automatic door-opening of the doors 3c to 3e (behavior requesting automatic door-opening). In this example, the smart control ECU 24 detects whether the user 30 has been staying in the out-of-compartment validation area 100d for a predetermined time (for example, several seconds). This makes it possible to determine whether the user 30 has been waiting for door-opening in front of the door 3d for a certain period after the doors 3a to 3e have been unlocked, namely, whether the user 30 has an intention to open the door 3d.

Specifically, the smart control ECU 24 has an internal timer start counting to determine whether the predetermined time passes. Also, to detect whether the user 30 is still staying in the out-of-compartment validation area 100d while the timer counts, the smart control ECU 24 may transmit a request signal (referred to as the "second request signal", below) for every predetermined time interval, to detect whether a response signal (referred to as the "second response signal", below) comes back from the electronic key 10 in response to the second request signal. Note that the second response signal may include or may not include information about the ID code and the reservation setting. In this way, the smart control ECU 24 can continuously detect the electronic key 10 having the reservation setting of automatic door-opening of the doors 3c to 3e, in the automatic door-opening area for the predetermined time. In other words, the smart control ECU 24 can detect that the user 30 holding the electronic key 10 has been staying in the automatic door-opening area for the predetermined time.

If detecting that (the user 30 holding) the electronic key 10 having the reservation setting of automatic door-opening of the doors 3c to 3e, has been staying in the automatic door-opening area for the predetermined time, the smart control ECU 24 opens the door 3d automatically.

At this moment, the smart control ECU 24 may reduce the door-opening speed of the door 3d slower than normal speed. For example, the smart control ECU 24 may reduce the door-opening speed of the door 3d slower than the normal speed via the body ECU 25 until the door 3d reaches a predetermined position between the start point and the end point on the opening trajectory of the door 3d. Then, after the predetermined position has been passed, the smart control ECU 24 may resume the normal door-opening speed of the door 3d. This makes it possible to give a temporal margin for the user 30 to stop the automatic door-opening of the door 3d if the user 30 notices an obstacle existing on the opening trajectory of the door 3d, after the automatic door-opening of the door 3d has been started. Also, by resuming the normal door-opening speed of the door 3d after the predetermined position has been passed on the opening trajectory of the door 3d, it is possible to prevent door-opening time of the door 3d from becoming unnecessarily longer while giving a temporal margin for the user 30 to stop the automatic door-opening of the door 3d.

Also, the smart control ECU 24 may have a time to pause while opening the door 3d. For example, just after having started an opening operation of the door 3d, the smart control ECU 24 may have a time to pause for a predetermined time (for example, several seconds) via the body ECU 25, and then, restarts opening the door 3$d$. This makes it possible, as in the case where the door-opening speed of the door 3$d$ is reduced to be slower than it normally is, to give a temporal margin for the user 30 to stop the automatic door-opening of the door 3$d$ if the user 30 notices an obstacle existing on the opening trajectory of the door 3$d$, after the automatic door-opening of the door 3$d$ has been started. Also, by appropriately adjusting the predetermined time for the door 3$d$ to pause, it is possible to prevent door-opening time of the door 3$d$ from becoming unnecessarily longer while giving a temporal margin for the user 30 to stop the automatic door-opening of the door 3$d$.

In this way, the user 30 holding the electronic key 10 having the reservation setting of automatic door-opening of the doors 3$c$ to 3$e$, can open the door 3$d$ automatically, by entering the out-of-compartment validation area 100$d$, and staying there, for example, for several seconds. Also, since staying in the out-of-compartment validation area 100$d$ for the predetermined time is the condition for automatic door-opening of the door 3$d$, it possible to give a temporal margin for the user to stop the automatic door-opening of the door, for example, if an obstacle or the like exists on the opening trajectory of the door 3$d$.

Next, a specific flow of an automatic door-opening control process by the vehicle door controlling device 1 (the smart control ECU 24), will be described.

Figure 3:
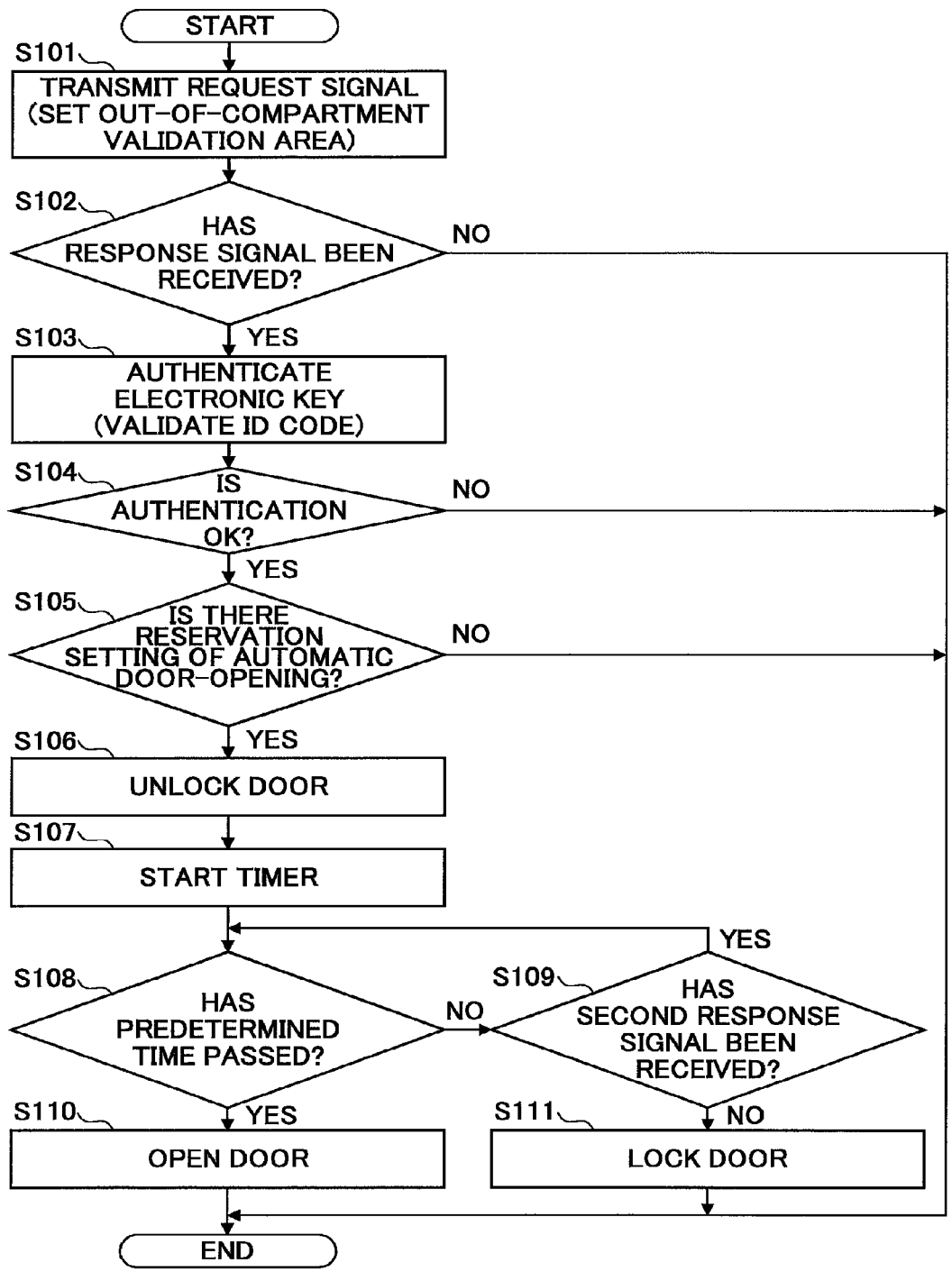
FIG. 3 is a flowchart that illustrates an example of an automatic door-opening control process of a door by the vehicle door controlling device according to the first embodiment.

FIG. 3 is a flowchart that illustrates an example of an automatic door-opening control process of the doors 3$c$ to 3$e$ by the vehicle door controlling device 1 (the smart control ECU 24). Note that the process is activated and executed every predetermined time while the vehicle 2 is in a stop state (for example, if the vehicle has the engine as the only power source, in an ignition off state).

First, Steps S101 to S105 are steps to detect whether (a user holding) the electronic key 10 having a reservation setting of automatic door-opening of the doors 3$c$ to 3$e$ exists in one of the out-of-compartment validation areas 100$c$ to 100$e$.

At Step S101, the smart control ECU 24 transmits a request signal. In other words, the smart control ECU 24 transmits the request signal via the out-of-compartment transmitters 22$c$ to 22$e$, to form the out-of-compartment validation areas 100$c$ to 100$e$, and goes forward to Step S102.

At Step S102, the smart control ECU 24 determines whether a response signal transmitted by the electronic key 10 has been received in response to the request signal that corresponds to one of the out-of-compartment validation areas 100$c$ to 100$e$. If a response signal has not been received, the current process ends. If a response signal has been received, the smart control ECU 24 goes forward to Step S103.

At Step S103, the smart control ECU 24 authenticates the electronic key 10. In other words, the smart control ECU 24 validates the ID code of the electronic key 10 included in the received response signal with the ID code registered in advance (stored in the ROM or the like of the smart control ECU 24), and goes forward to Step S104.

At Step S104, the smart control ECU 24 determines whether the electronic key 10 has been authenticated. Specifically, the smart control ECU 24 determines whether the ID code of the electronic key 10 included in the received response signal is equivalent to the ID code registered in advance (stored in the ROM or the like of the smart control ECU 24). If the electronic key 10 is not authenticated, the current process ends. If the electronic key 10 is authenticated, the smart control ECU 24 goes forward to Step S105.

At Step S105, the smart control ECU 24 determines whether information about the reservation setting of automatic door-opening of the doors 3$c$ to 3$e$, is included in the received response signal. If the information about the reservation setting is not included in the received response signal, the current process ends. If the information about the reservation setting is included in the received response signal, the smart control ECU 24 goes forward to Step S106.

By Steps S101 to S105, it is possible to detect in which one of the out-of-compartment validation areas 100$c$ to 100$e$, the electronic key 10 having the reservation setting of automatic door-opening of the doors 3$c$ to 3$e$ exists. In other words, it is possible to determine that a user holding the electronic key 10 having the reservation setting of automatic door-opening of the doors 3$c$ to 3$e$ exists in one of the out-of-compartment validation areas 100$c$ to 100$e$. Therefore, at Step S106, the smart control ECU 24 unlocks the doors 3$a$ to 3$e$. Specifically, the smart control ECU 24 transmits a door unlock request signal to the body ECU 25, and in response to the door unlock request signal, the body ECU 25 unlocks the doors 3$a$ to 3$e$ by controlling driving the door lock unit 27. Note that at this moment, the doors to be unlocked may be restricted depending on in which one of the out-of-compartment validation areas 100$c$ to 100$e$, the user holding the electronic key 10 having the reservation setting of automatic door-opening of the doors 3$c$ to 3$e$ has been detected.

Step S107s to S109 are steps to determine whether the user holding the electronic key 10 having the reservation setting of automatic door-opening of the doors 3$c$ to 3$e$ detected in one of the out-of-compartment validation areas 100$c$ to 100$e$, is still staying in the same out-of-compartment validation area. In other words, the steps are to determine whether the user has an intention to open the one of the doors 3$c$ to 3$e$.

At Step S107, the smart control ECU 24 starts the internal timer in parallel with Step S106, and goes forward to Step S108.

At Step S108, the smart control ECU 24 determines whether the predetermined time (for example, several seconds) has passed since the start of the timer. If the predetermined time has not passed, the smart control ECU 24 goes forward to Step S109.

At Step S109, the smart control ECU 24 transmits a second request signal from the out-of-compartment transmitters 22$c$ to 22$e$, and determines whether a second response signal transmitted from the electronic key 10 is received in response to the second request signal. Here, at Steps S101 to S105, the smart control ECU 24 may restrict out-of-compartment transmitters to transmit the second request signal, among the out-of-compartment transmitters 22$c$ to 22$e$, depending on in which one of the out-of-compartment validation areas 100$c$ to 100$e$, (the user holding) the electronic key 10 having the reservation setting of automatic door-opening of the doors 3$c$ to 3$e$ has been detected. For example, if (the user holding) the electronic key 10 has been detected in the out-of-compartment validation area 100$d$ (namely, if the response signal transmitted from the electronic key 10 comes in response to the request signal transmitted from the out-of-compartment transmitter 22$d$), the second request signal may be transmitted from the out-of-compartment transmitter 22$d$. Thus, it is possible to determine whether (the user holding) the electronic key 10 having the reservation setting of automatic door-opening of the doors 3$c$ to 3$e$ detected by Steps S101 to S105, still exists in the same out-of-compartment validation area. If having received the second response signal, the smart control ECU 24 goes back to Step S108.

In this way, by repeating Steps S108 and S109 at predetermined time intervals, time can be measured during which (the user holding) the electronic key 10 having the reservation setting of automatic door-opening of the doors 3c to 3e detected by Steps S101 to S105, continues to exist in the same out-of-compartment validation area.

While repeating Steps S108 and S109, if the predetermined time has passed since the start of the timer at Step S108, the smart control ECU 24 goes forward to Step S110.

At Step S110, the smart control ECU 24 automatically opens the door that corresponds to the out-of-compartment validation area where (the user holding) the electronic key 10 having the reservation setting of automatic door-opening of the doors 3c to 3e has been detected, and terminates the process flow. Specifically, the smart control ECU 24 transmits a door-opening request signal to the body ECU 25, and in response to the door-opening request signal, the body ECU 25 controls driving the door drive unit 26 to open the door automatically. This makes it possible for the user to access the inside of the vehicle 2 without operating on the door handle and/or the electronic key 10. Also, if (the user holding) the electronic key 10 having the reservation setting of automatic door-opening of the doors 3c to 3e continues to exist in the out-of-compartment validation area, the doors 3c to 3e are opened. Therefore, automatic door-opening of the doors 3c to 3e can be executed considering the intention of the user and the circumstance around the vehicle. In other words, if there is an obstacle on the opening trajectories of the doors 3c to 3e, the user can stop door-opening by getting out of the out-of-compartment validation area at timing when the user recognizes the obstacle. Also, if the user forgets that the user has made a reservation setting of automatic door-opening of the doors 3c to 3e, and has no intention to open any of the doors 3c to 3e, the user can stop door-opening by getting out of the out-of-compartment validation area at timing when the user recognizes an operation sound of door-unlocking or the like of the actuator for door-locking.

Note that at Step S110, as described above, the smart control ECU 24 may reduce the door-opening speed of the door 3d slower than normal speed when opening the door, or may have a time to pause while opening the doors 3c to 3e. Specifically, the smart control ECU 24 transmits a door-opening request signal to the body ECU 25 based on a reservation setting which is different from a normal door-opening request signal. Then, in response to the door-opening request signal, the body ECU 25 may control the door-opening speed of the doors 3c to 3e that is different from the normal speed. For example, by controlling the door drive unit 26, the body ECU 25 may reduce the door-opening speed of the doors 3c to 3e slower than the normal speed when starting opening the doors 3c to 3e, until the door reaches a predetermined position on the opening trajectory, and may resume the normal door-opening speed after the door has passed the predetermined position. Also, just after having started the opening operation of the door (for example, one second after starting the door-opening operation), the body ECU 25 may have a time to pause for a predetermined time, and then, restarts opening the door at the normal door-opening speed once the time has passed. This makes it possible to give a temporal margin for the user to stop the automatic door-opening of the doors 3c to 3e if the user notices an obstacle existing on the opening trajectory of the doors 3c to 3e, after the automatic door-opening of the doors 3c to 3e has been started. Note that the user may stop automatic door-opening of the doors 3c to 3e, for example, by operating a door handle, or operating the command unit 13 of the electronic key 10.

On the other hand, while repeating Steps S108 and S109, if the smart control ECU 24 does not receive a second response signal at Step S109, namely, if the user gets out of the out-of-compartment validation area, the smart control ECU 24 goes forward to Step S111.

At Step S111, the smart control ECU 24 locks the doors 3a to 3e that have been unlocked at Step S106, and terminates the process flow. This is because it is possible to determine that the user gets out of the out-of-compartment validation area, and has no intention to open the doors 3c to 3e automatically.

Next, operations of the vehicle door controlling device 1 will be described according to the embodiment.

The vehicle door controlling device 1 (the smart control ECU 24) according to the embodiment detects whether (a user holding) the electronic key 10 having a reservation setting of automatic door-opening of the doors 3c to 3e exists in the out-of-compartment validation area, based on a response signal transmitted from the electronic key 10. Also, the vehicle door controlling device 1 (the smart control ECU 24) detects predetermined behavior by the user holding the electronic key 10 having the reservation setting of the doors 3c to 3e detected in the out-of-compartment validation area, as an automatic door-opening request of the doors 3c to 3e. Specifically, the vehicle door controlling device 1 (the smart control ECU 24) detects whether (the user holding) the electronic key 10 continues to exist in the out-of-compartment validation area for the predetermined time. Then, if detecting that (the user holding) the electronic key 10 having the reservation setting of the doors 3c to 3e exists in the out-of-compartment validation area, the vehicle door controlling device 1 (the smart control ECU 24) unlocks the doors 3a to 3e. Furthermore, if detecting that (the user holding) the electronic key 10 detected in the out-of-compartment validation area, continues to exist in the out-of-compartment validation area for the predetermined time, the vehicle door controlling device 1 (the smart control ECU 24) opens one of the doors 3c to 3e automatically (that corresponds to the out-of-compartment validation area where (the user holding) the electronic key 10 having the reservation setting of automatic door-opening of the doors 3c to 3e has been detected). Thus, automatic door-opening of the doors 3c to 3e can be performed considering the intention of the user (intention to open the door). Also, for example, if an obstacle or the like exists on the opening trajectory of the doors 3c to 3e, it is possible to give a temporal margin for the user to stop the automatic door-opening of the door. In other words, by giving a temporal margin for the user to confirm a circumstance around the vehicle, depending on the circumstance around the vehicle, the user may stop the predetermined behavior (continuing to stay in the out-of-compartment validation area), to stop the automatic door-opening. Thus, automatic door-opening of the doors 3c to 3e can be executed considering the circumstance around the vehicle.

Also, the vehicle door controlling device 1 (the smart control ECU 24) according to the embodiment may reduce the door-opening speed of the doors 3c to 3e slower than the normal speed, when executing automatic door-opening of the doors 3c to 3e based on the reservation setting of automatic door-opening of the doors 3c to 3e in the electronic key 10. Specifically, the smart control ECU 24 may reduce the door-opening speed of the door 3d slower than the normal speed via the body ECU 25 after having started the opening operation of the door until reaching a predetermined position on the opening trajectory of the doors 3*c* to 3*e*, and may resume the normal door-opening speed after the door has passed the predetermined position. This makes it possible to give a temporal margin for the user to stop the automatic door-opening of the doors 3*c* to 3*e* if the user notices an obstacle existing on the opening trajectory of the doors 3*c* to 3*e*, after the automatic door-opening of the doors 3*c* to 3*e* has been started. In other words, even after the automatic door-opening of the doors 3*c* to 3*e* has been started, it is possible to have the user stop the automatic door-opening, considering the circumstance around the vehicle.

Also, the vehicle door controlling device 1 (the smart control ECU 24) has one of the doors 3*c* to 3*e* open automatically that corresponds to the out-of-compartment validation area where (the user holding) the electronic key 10 having the reservation setting of automatic door-opening of the doors 3*c* to 3*e* has been detected. Thus, even if there are multiple doors that can be opened automatically, it is possible to open a desired door automatically, by approaching the door to be opened automatically, entering the out-of-compartment validation area corresponding to the door (and staying there).

[Second Embodiment]

Next, a second embodiment will be described.

A vehicle door controlling device 1 according to the second embodiment differs from the first embodiment in that after the doors 3*a* to 3*e* has been unlocked, if the user (the electronic key 10) further approaches the vehicle 2, it is detected as a predetermined behavior representing an automatic door-opening request of the door by the user, and in response to the predetermined behavior, the door is opened automatically. In the following, the same elements as in the first embodiment are assigned the same codes, and different parts will be mainly described.

The configuration of the vehicle door controlling device 1 according to the embodiment is also represented by FIG. 1 as in first embodiment, and the description is omitted.

Next, the smart entry control by the vehicle door controlling device 1 (the smart control ECU 24) in the embodiment will be described, especially, about automatic door-opening control of the doors 3*c* to 3*e* based on a reservation setting in the electronic key 10.

Figure 4A:
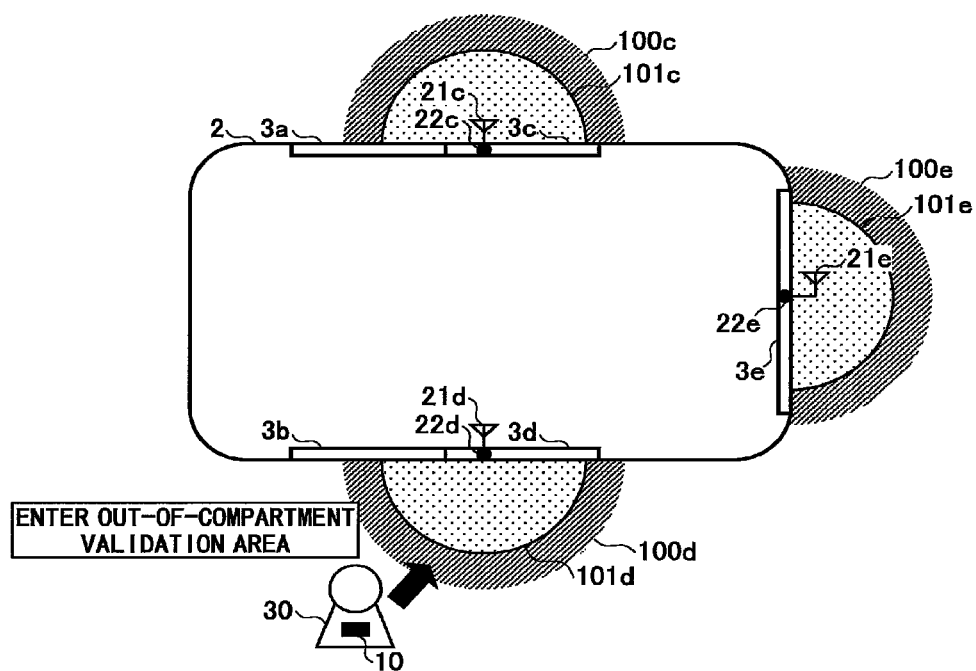
FIGS. 4A-4B are diagrams that illustrate operations of a vehicle door controlling device according to a second embodiment.
Figure 4B:
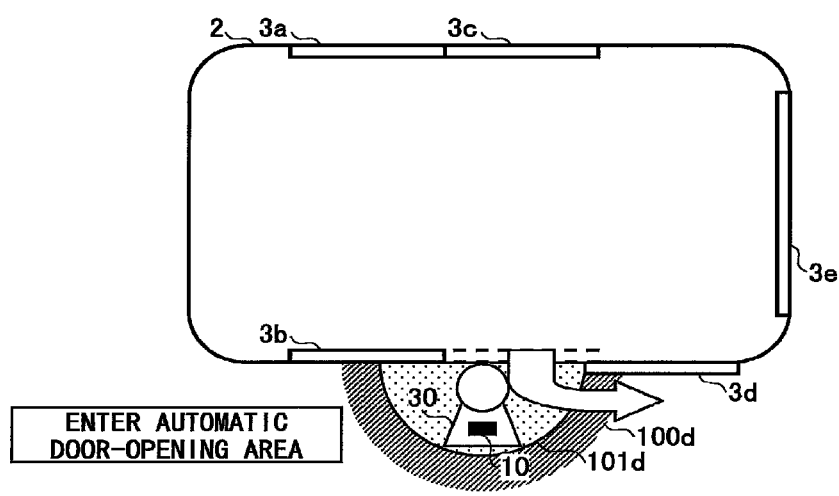

FIGS. 4A-4B are diagrams that illustrate operations of the vehicle door controlling device 1 according to the embodiment. Specifically, the figures are plan views of the vehicle 2 that schematically illustrates automatic door-opening control of the doors 3*c* to 3*e* based on the reservation setting in the electronic key 10. Both FIGS. 4A and 4B represent examples of situations in which a user 30 of the vehicle 2, who holds the electronic key 10 having the reservation setting of automatic door-opening of the doors 3*c* to 3*e*, approaches the door 3*d*, which is a rear door on the left side of the vehicle 2, to get seated (or to load luggage) on a rear seat of the vehicle 2. Note that FIGS. 4A and 4B illustrate examples where the user 30 approaches the door 3*d*, and the door 3*d* is opened. Situations are virtually the same if the user 30 approaches the door 3*c* or 3*e*, and description of those cases is omitted.

Similar to FIG. 2A in the first embodiment, FIG. 4A is a diagram that illustrates that the user 30 holding the electronic key 10 having the reservation setting of automatic door-opening of the doors 3*c* to 3*e*, enters the out-of-compartment validation area 100*d* of the door 3*d*. Operations of the vehicle door controlling device 1 in this case are the same as in the first embodiment, and the description is omitted.

Also, FIG. 4*b* illustrates a case where the user 30 holding the electronic key 10 having the reservation setting of automatic door-opening of the doors 3*c* to 3*e*, carries out predetermined behavior that requests automatic door-opening, namely, the user 30 further enters an automatic door-opening area (a second area) 101*d*.

In this case, after having unlocked the doors 3*a* to 3*e*, the smart control ECU 24 detects the predetermined behavior of the user 30 holding the electronic key 10 having the reservation setting of automatic door-opening of the doors 3*c* to 3*e* (behavior requesting automatic door-opening). In this example, the smart control ECU 24 detects whether the user 30 has further entered the automatic door-opening area 101*d*. Here, the automatic door-opening area 101*d* is an area included in the out-of-compartment validation area 100*d*, and formed on the side approaching the door 3*d* in the out-of-compartment validation area 100*d*. This makes it possible to determine whether the user 30 has further approached the door 3*d*, namely, whether the user 30 has an intention to open the door 3*d*. Note that automatic door-opening areas 101*c* and 101*e* that correspond the out-of-compartment validation areas 100*c* and 100*e* may be formed similarly, or only the automatic door-opening area 101*d* may be formed if the user 30 has been detected in the out-of-compartment validation area 100*d* as in this example.

Specifically, the smart control ECU 24 transmits an automatic door-opening signal via the out-of-compartment transmitter 22*d*. The automatic door-opening area 101*d* is formed to have a semicircular shape in plan view, with an outer edge set by the reachable range of the request signal. Note that the smart control ECU 24 controls the out-of-compartment transmitter 22*d* to set the reachable range of an automatic door-opening signal shorter than a request signal so that the automatic door-opening area 101*d* is included in the out-of-compartment validation area 100*d*, and formed on the side approaching the door 3*d* in the out-of-compartment validation area 100*d*. If receiving the automatic door-opening signal via the receiver 11, the electronic key 10 (the electronic key ECU 15) transmits a corresponding automatic door-opening request signal to the vehicle-side controller 20 (the smart control ECU 24) via the transmitter 12. By receiving the automatic door-opening request signal, the smart control ECU 24 can detect the electronic key 10 having the reservation setting of automatic door-opening of the doors 3*c* to 3*e* in the automatic door-opening area. In other words, the smart control ECU 24 can detect that the user 30 holding the electronic key 10 has entered the automatic door-opening area.

If detecting that the user 30 holding the electronic key 10 having the reservation setting of automatic door-opening of the doors 3*c* to 3*e* has entered in the automatic door-opening area 101*d*, the smart control ECU 24 opens the door 3*d* automatically.

At this moment, as in the first embodiment, the smart control ECU 24 may reduce the door-opening speed of the door 3*d* slower than the normal speed, or may have a time to pause while opening the door 3*d*. Specific contents are the same as in the first embodiment, and the description is omitted.

In this way, the user 30 holding the electronic key 10 having the reservation setting of automatic door-opening of the doors 3*c* to 3*e* enters the out-of-compartment validation area 100*d*, further approaches the door 3*d*, and enters the automatic door-opening area 101*d*, to be able to open the door 3d automatically. Also, since entering the out-of-compartment validation area 100d followed by further entering the automatic door-opening area 101d (having approached the door 3d), is the condition for automatic door-opening of the door 3d, it possible to give a temporal margin for the user to stop the automatic door-opening of the door, for example, if an obstacle or the like exists on the opening trajectory of the door 3d.

Next, a specific flow of an automatic door-opening control process by the vehicle door controlling device 1 (the smart control ECU 24), will be described.

Figure 5:
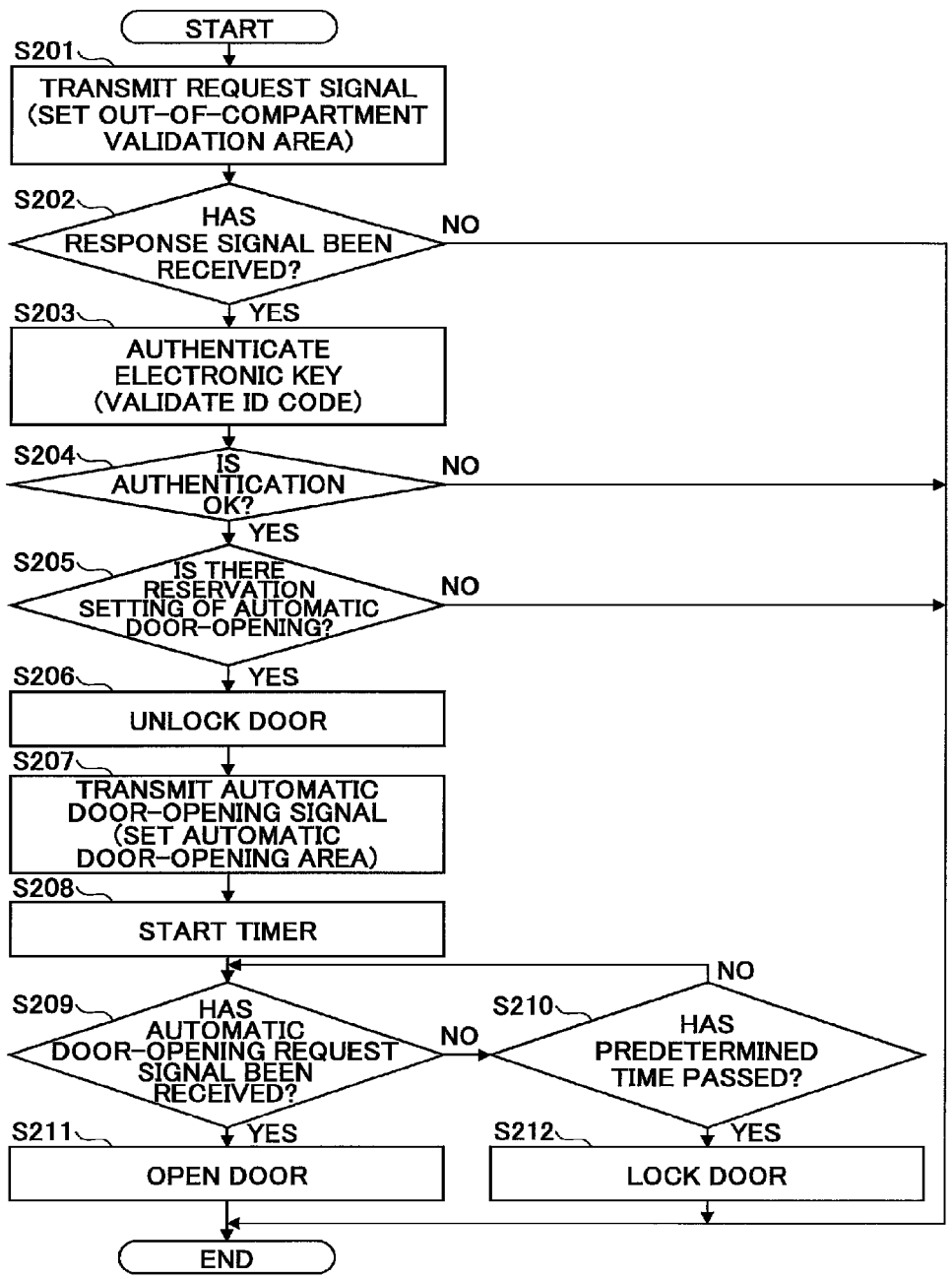
FIG. 5 is a flowchart that illustrates an example of an automatic door-opening control process of a door by the vehicle door controlling device according to the second embodiment.

FIG. 5 is a flowchart that illustrates an example of an automatic door-opening control process of the doors 3c to 3e by the vehicle door controlling device 1 (the smart control ECU 24). Note that the process is activated and executed every predetermined time while the vehicle 2 is in a stop state (for example, if the vehicle has the engine as the only power source, in an ignition off state).

First, Step S201 to S205 are steps to detect whether a user holding the electronic key 10 having a reservation setting of automatic door-opening of the doors 3c to 3e exists in one of the out-of-compartment validation areas 100c to 100e. These steps are the same as Steps S101 to S105 in FIG. 3 in the first embodiment, and specific description is omitted.

By Steps S201 to S205, it is possible to detect in which one of the out-of-compartment validation areas 100c to 100e, the electronic key 10 having the reservation setting of automatic door-opening of the doors 3c to 3e exists. In other words, it is possible to determine that a user holding the electronic key 10 having the reservation setting of automatic door-opening of the doors 3c to 3e exists in one of the out-of-compartment validation areas 100c to 100e. Therefore, at Step S206, the smart control ECU 24 unlocks the doors 3a to 3e. Step S206 is the same as Step S106 in FIG. 3 in the first embodiment, and specific description is omitted.

Step S207 to S210 are steps to determine whether the user holding the electronic key 10 having the reservation setting of automatic door-opening of the doors 3c to 3e detected in one of the out-of-compartment validation areas 100c to 100e, is further detected in the corresponding one of the automatic door-opening areas 101c to 101e. In other words, the steps are to determine whether the user has an intention to open the corresponding one of the doors 3c to 3e.

At Step S207, the smart control ECU 24 transmits an automatic door-opening signal described above. In other words, the smart control ECU 24 forms the automatic door-opening areas 101c to 101e by the automatic door-opening signal transmitted via the out-of-compartment transmitters 22c to 22e, and goes forward to Step S208. Note that at Step S201 to S205, the smart control ECU 24 may restrict out-of-compartment transmitters to transmit the automatic door-opening signal, among the out-of-compartment transmitters 22c to 22e, depending on in which one of the out-of-compartment validation areas 100c to 100e, (the user holding) the electronic key 10 having the reservation setting of automatic door-opening of the doors 3c to 3e has been detected. For example, if (the user holding) the electronic key 10 has been detected in the out-of-compartment validation area 100d (namely, if the response signal transmitted from the electronic key 10 comes in response to the request signal transmitted from the out-of-compartment transmitter 22d), the automatic door-opening signal may be transmitted from the out-of-compartment transmitter 22d, to form only the automatic door-opening area 101d. Thus, it is possible to determine whether the user holding the electronic key 10 having the reservation setting of automatic door-opening of the doors 3c to 3e detected by Steps S201 to S205, has further entered the automatic door-opening area in the same out-of-compartment validation area.

At Step S208, the smart control ECU 24 starts the internal timer in parallel with Step S206, and goes forward to Step S209.

At Step S209, the smart control ECU 24 determines whether an automatic door-opening request signal transmitted from the electronic key 10 is received in response to the automatic door-opening signal. If not having received an automatic door-opening request signal, the smart control ECU 24 goes forward to Step S210.

At Step S210, the smart control ECU 24 determines whether a time limit has passed since the start of the timer. Note that the time limit is to limit time for determining reception of an automatic door-opening request signal at Step S209, namely, to limit time during which determination is continued whether (the user holding) the electronic key 10 is detected in the automatic door-opening area. If the predetermined time has not passed, the smart control ECU 24 goes back to Step S209.

In this way, by repeating Steps S209 and S210 at predetermined time intervals, it is possible to detect whether the user holding the electronic key 10 having the reservation setting of automatic door-opening of the doors 3c to 3e detected by Steps S201 to S205, has entered the automatic door-opening area within the time limit.

While repeating Steps S209 and S210, if receiving an automatic door-opening request signal, the smart control ECU 24 goes forward to Step S211.

At Step S211, the smart control ECU 24 opens the door that corresponds to the out-of-compartment validation area where (the user holding) the electronic key 10 having the reservation setting of automatic door-opening of the doors 3c to 3e has been detected, and terminates the process flow. The specific processing operation by the smart control ECU 24 is the same as Step S110 in FIG. 3 in the first embodiment, and the description is omitted. Note that as in the first embodiment, the smart control ECU 24 may reduce the door-opening speed of the door slower than normal speed when opening the door, or may have a time to pause after having started opening the door.

In this way, when a user enters an out-of-compartment validation area, and further approaches the doors 3c to 3e to enter an automatic door-opening area, the doors 3c to 3e are opened. Therefore, automatic door-opening of the doors 3c to 3e can be executed considering the intention of the user and the circumstance around the vehicle. In other words, for example, if there is an obstacle on the opening trajectories of the doors 3c to 3e, the user can stop door-opening by stopping further approaching the door. Also, if the user forgets that the user has made a reservation setting of automatic door-opening of the doors 3c to 3e, and has no intention to open any of the doors 3c to 3e, the user can stop door-opening by stopping further approaching the door when the user recognizes an operation sound of door-unlocking or the like of the actuator for door-locking.

On the other hand, while repeating Steps S209 and S210, if the smart control ECU 24 determines that the time limit has passed since the start of the timer, namely, if the user stops approaching the doors 3c to 3e, the smart control ECU 24 goes forward to Step S212.

At Step S212, the smart control ECU 24 locks the doors 3a to 3e that have been unlocked at Step S206, and terminates the process flow. This is because it is possible to determine that if the user does not enter the automatic door-opening area within the time limit, the user has no intention to open the doors 3c to 3e automatically.

Next, operations of the vehicle door controlling device 1 will be described according to the embodiment. Note that operations specific to the embodiment will be mainly described, and the description is omitted for the same operations as in the first embodiment.

The vehicle door controlling device 1 (the smart control ECU 24) in the embodiment detects predetermined behavior by a user holding the electronic key 10 having a reservation setting of the doors 3c to 3e detected in the out-of-compartment validation area, as an automatic door-opening request of the doors 3c to 3e. Specifically, the vehicle door controlling device 1 (the smart control ECU 24) detects whether the user further approaches the doors 3c to 3e, and exists in the automatic door-opening area (an area included in the out-of-compartment validation area, and formed on the side approaching the door in the out-of-compartment validation area). Then, if detecting that (the user holding) the electronic key 10 having the reservation setting of the doors 3c to 3e exists in the out-of-compartment validation area, the vehicle door controlling device 1 (the smart control ECU 24) unlocks the doors 3a to 3e. Furthermore, if detecting that (the user holding) the electronic key 10 detected in the out-of-compartment validation area, exists in the automatic door-opening area corresponding to the out-of-compartment validation area, the vehicle door controlling device 1 (the smart control ECU 24) opens (one of) the doors 3c to 3e automatically (that corresponds to the out-of-compartment validation area where the user has been detected). Thus, as in the first embodiment, automatic door-opening of the doors 3c to 3e can be performed considering the intention of the user (intention to open the door). Also, for example, if an obstacle or the like exists on the opening trajectory of the doors 3c to 3e, it is possible to give a temporal margin for the user to stop the automatic door-opening of the door. In other words, by giving a temporal margin for the user to confirm a circumstance around the vehicle, depending on the circumstance around the vehicle, the user may stop the predetermined behavior (further approaching the door to enter the automatic door-opening area), to stop the automatic door-opening. Thus, automatic door-opening of the doors 3c to 3e can be executed considering the circumstance around the vehicle.

The embodiments have been described in detail. Note that embodiments are not limited to the above specific embodiments, but various changes, substitutions, and alterations could be made.

For example, in the embodiments described above, although the doors 3c to 3e as targets of the automatic door-opening control by the vehicle door controlling device 1 are those for a minivan, a door of any vehicle can be a target of the automatic door-opening control as long as it can be opened automatically.

The present application is based on and claims the benefit of priority of Japanese Priority Application No. 2013-238261, filed on Nov. 18, 2013, the entire contents of which are hereby incorporated by reference.

DESCRIPTION OF REFERENCE SYMBOLS 1 vehicle door controlling device
2 vehicle
3a-3e door
10 electronic key (mobile device)
12 transmitter (transmitter unit)
15 electronic key ECU
20 a vehicle-side controller
21a-21e out-of-compartment antenna
22a-22e out-of-compartment transmitter
23 tuner (receiver unit)
24 smart control ECU (user detection unit, user behavior detection unit, control unit)
25 body ECU (control unit)
26 door drive unit
27 door lock unit
100a-100e out-of-compartment validation area (first area)
101c-101e automatic door-opening area (second area)

The invention claimed is:

1. A vehicle door controlling device, comprising:
a vehicle-side controller, installed on a vehicle including a door capable of being opened automatically; and
a mobile device on which a reservation setting of automatic door-opening of the door can be made by a user,
wherein the mobile device includes a transmitter unit configured to transmit a signal that includes information about the reservation setting, by a wireless communication function,
wherein the vehicle-side controller includes a receiver unit configured to receive the signal transmitted from the mobile device,
a detection unit configured to detect the mobile device having the reservation setting and existing in an area around the door, based on the signal received by the receiver unit, and
a control unit configured to unlock the door when the mobile device having the reservation setting has been detected in the area around the door by the detection unit, and to open the door when the mobile device detected in the area around the door by the detection unit is further being detected in the area around the door for a predetermined time.

2. The vehicle door controlling device as claimed in claim 1, wherein when opening the door, the control unit reduces the door-opening speed of the door between a start point and a predetermined position slower than the door-opening speed of the door between the predetermined position and an end point on an opening trajectory of the door.

3. The vehicle door controlling device as claimed in claim 1, wherein the control unit pauses opening the door after having started opening the door.

4. The vehicle door controlling device as claimed in claim 1, wherein the vehicle includes a plurality of the doors,
wherein the detection unit is further configured to be capable of detecting in which one of the areas around the door corresponding to respective doors of the plurality of doors, the mobile device having the reservation setting exists,
wherein the control unit opens the door that corresponds to the area around the door in which the mobile device having the reservation setting has been detected by the detection unit.

5. A vehicle door controlling device, comprising:
a vehicle-side controller, installed on a vehicle including a door capable of being opened automatically; and
a mobile device on which a reservation setting of automatic door-opening of the door can be made by a user,
wherein the mobile device includes a transmitter unit configured to transmit a signal that includes information about the reservation setting, by a wireless communication function,
wherein the vehicle-side controller includes a receiver unit configured to receive the signal transmitted from the mobile device, a first detection unit configured to detect the mobile device having the reservation setting, and existing in a first area around the door, based on the signal received by the receiver unit, a second detection unit configured to detect the mobile device existing in a second area included in the first area and formed on a side approaching the door in the first area, based on the signal received by the receiver unit, and a control unit configured to unlock the door when the mobile device having the reservation setting has been detected in the first area by the first detection unit, and to open the door when the mobile device detected in the first area by the first detection unit is further detected in the second area by the second detection unit.

6. The vehicle door controlling device as claimed in claim 5, wherein when opening the door, the control unit reduces the door-opening speed of the door between a start point and a predetermined position slower than the door-opening speed of the door between the predetermined position and an end point on an opening trajectory of the door.

7. The vehicle door controlling device as claimed in claim 5, wherein the control unit pauses opening the door after having started opening the door.

8. The vehicle door controlling device as claimed in claim 5, wherein the vehicle includes a plurality of the doors, wherein the first detection unit is further configured to be capable of detecting in which one of the first areas corresponding to the respective doors, the mobile device having the reservation setting exists, wherein the control unit opens the door that corresponds to the first area in which the mobile device having the reservation setting has been detected by the first detection unit.

* * * * *